United States Patent [19]

Krueger

[11] 4,402,124

[45] Sep. 6, 1983

[54] METHOD OF PRESSURE LOCKING AN APERATURED NUT INTO A DIE-SIDE HOLE OF A METAL PLATE

[76] Inventor: Guenther Krueger, 16 Bristol Ct., Berkeley Heights, N.J. 07422

[21] Appl. No.: 342,187

[22] Filed: Jan. 25, 1982

[51] Int. Cl.³ .................. B21D 39/00; B23P 11/00
[52] U.S. Cl. .................... 29/520; 29/522 R; 411/181
[58] Field of Search .............. 29/509, 520, 522 R, 29/283.5; 411/180, 172, 174, 179, 181

[56] References Cited

U.S. PATENT DOCUMENTS

| | | | |
|---|---|---|---|
| 2,177,191 | 10/1939 | Sandberg | 29/520 |
| 2,438,744 | 3/1948 | Flynn | 29/283.5 X |
| 2,486,769 | 11/1949 | Watson, Jr. | 411/180 |
| 2,703,998 | 3/1955 | Sowter | 78/470.1 |
| 3,000,420 | 9/1961 | Spokes | 411/180 |
| 3,125,146 | 3/1964 | Rosan | 411/180 |
| 3,187,424 | 6/1965 | Double et al. | 29/520 X |
| 3,242,962 | 3/1966 | Dupree | 29/520 X |
| 3,276,499 | 10/1966 | Reusser | 29/520 X |
| 3,399,705 | 9/1968 | Breed et al. | 29/520 X |
| 3,443,617 | 5/1969 | Whiteside et al. | 411/181 X |
| 3,878,598 | 4/1975 | Steward | 29/520 X |
| 4,281,786 | 8/1981 | Krueger | 228/116 |

Primary Examiner—Charlie T. Moon
Attorney, Agent, or Firm—William T. Hough

[57] ABSTRACT

For metal plate having a thickness of at least ¼ inch thick, having a die-punched aperature therein characterized by a die-side hole of a greater diameter and flared aperature channel walls at the die-side hole as compared to an opposite punch-side hole of lesser diameter, inserting into the die-side hole a lower end of a shaft of a particular nut through the aperature and out of the punch-side hole, before pressing the nut downwardly into the aperature a lower edge of a nut head of a diameter larger than the aperature's diameter and smaller than the diameter of the die-side hole at a face of the metal plate on the die-side thereof, being positioned to rest on the flared aperature channel walls at a point spaced-below the face of the plate on the die-side face thereof, pressing the nut downwardly into the aperature, and pressing metal material of the metal plate into a recessed-space formed along an intermediate portion of the nut's shaft in which the intermediate portion has a reduced diameter as compared to the lower end of the shaft at locations circumscribing the punch-side hole of the metal plate sufficiently to lock-in the nut against withdrawal thereof from the aperature; the nut so-defined is utilizable in the method, and the locked-in nut results in a new metal-plate nut combination.

6 Claims, 4 Drawing Figures

METHOD OF PRESSURE LOCKING AN APERATURED NUT INTO A DIE-SIDE HOLE OF A METAL PLATE

THE INVENTION

This invention is directed to a method of locking a nut into a metal plate having thickness of 3/16 inch or more, the nut that is utilizable therein, and the resulting product of metal-plate and locked-in nut combination.

BACKGROUND TO THE INVENTION

Prior to this invention, utilizable for metat sheet of thickness up to about 3/16 inch, applicant invented and patented a method set-forth in U.S. Pat. No. 4,281,786. However, for metal plate of a thickness of at least about ¼ inch or more, that method does not work, failing to secure or lock-in a nut into an aperature into which it is inserted. Accordingly, applicant conducted extensive tests and experiments thereby making efforts and attempts to devise some other method for use with such metal plates of greater thickness.

Accordingly, the most relevant prior art is the inventor's own prior U.S. Pat. No. 4,281,786 which for metal plate of ¼ inch or more thickness is inoperative and provides therefore no teaching for the present invention, even though there are similarities in the pressing apparatus and nut employed. It is the differences in the method and the particular diameters of the different portions of the nut, and the relative size of the nut to the holes of the aperature in the plate that obtain the success of the present invention as shall be described below.

Aside from the above-noted patent, even further irrelevant are such prior art patents as U.S. Pat. No. 3,399,705 to Breed et al., and Sowter U.S. Pat. No. 2,703,998. The Breed et al patent employs a nut having a downwardly-extending circumscribing nut-head flange which when the nut is pressed downward with its shaft in the aperature, causes sheet metal adjacent the aperature to be squeezed inwardly beneath the overhanging portion of the nut head and against the shaft of the nut positioned within the aperature space. The present invention does not require such a downwardly-extending nut-head flange. The Sowter patent, less relevant than applicant's own above-noted patent, does not relate at all to the mounting of an annular nut within an aperature; rather, the Sowter patent relates to securing a headed-shaft and is devoid of a stepped-shaft of the type required for the present invention, and thus is clearly non-teaching with regard to the solutions reached by applicant where such stepped nut-shaft structure is necessary. Moreover, even if all structures of the nut and press were fully disclosed as the prior art, the present invention requires the particular mounting method in order to obtain success, it has been ascertained during extensive experimentation arriving at the present invention. Accordingly the prior art to the present invention is not material.

BROAD DESCRIPTION OF THE INVENTION

Thus, a primary object of this invention is to obtain necessary aperatured metal plates and particular necessary nuts, and by a particular process obtain a mounted nut for a metal plate having a plate thickness of at least about ¼ inch or more.

More particularly, an object is to securely mount a nut in a plate of such thickness, by a method that is simple and speedy but which results in a securely fixed nut resistant to being pulled or wrenched from its mounted state.

Another object for such a thick plate, is to also achieve a locking of the nut against twisting within the aperature in which it is mounted, when subjected to excessive torques.

Another object is to achieve one or more of the preceding objects with nuts and apertured plates of a nature inexpensively achieved, and by a method characterized by low cost, in order to make such a commercial practicality.

Other objects become apparent from the preceding and following disclosure.

One or more objects of this invention are obtained by the invention as described herein and is illustrated in accompanying drawings of the designated figures which are intended to illustrate a preferred invention, but which also is intended to include variations thereon within ordinary skill as within the scope of the invention.

Broadly the invention may be described as each of a novel process or method, and a novel particular nut, and a metal plate combination with such nut in the mounted state mounted by the method of this invention.

More particularly, the particular nut must be characterized and described in relationship to the metal plate and its aperature and holes of the aperature on each of opposite sides of the plate, and the aperature is one of the type that results from the normal method of imparting aperatures to metal plates of about ¼ inch thickness, for example, namely imparting an aperature by die-punching the plate. To understand the nature of the present invention, it is thus necessary to understand that such aperature is caused by having an annular die structure against one side of the metal plate and thereupon pressing a punch against the opposite opposing side of the plate, causing a slug of metal plate to be punched-out-of the plate; as the punch is pressed deeply into and below the plate's punch-side of the plate, metal being punched-from the plate becomes sheared-off relatively evenly—having a punch-side hole diameter only fractionally (one or two thousands inch) larger than the punch itself. However, after the punch pierces the metal plate a particular depths, the metal from that point onward (toward the die) becomes ripped-out such that the slug become partially conically-shaped for that remaining depth, and the hole resulting therefrom on the die-side of the plate is flared in appearance and thus has a die-side hole diameter much larger than the punch-side hole, the punch-side being the side of the plate that the punch first contacted and pierced. Heretofore, the normal practice has been to mount a nut within a sheet or plate by insertion of the shaft of the nut into the die-side hole of the die-punched aperature, probably associated with some belief that a better and more effective fit and seating would be obtained thereby. In any event, for the invention of the above-noted prior patent U.S. Pat. No. 4,281,786, the nut can be inserted from either side of the aperature but normally is inserted from the punch-side of the plate into the aperature, for metal sheet of thickness 3/16 inch or less. When thickness is greater than 3/16 inch, commercially the metal structure is termed "plate," i.e. metal plate in the commercial language of the art.

Accordingly, for the present invention, it is critical and necessary that the nut's shaft be inserted from the die-side of the sheet into the flared-hole known as the die-side hole, and that the diameter of the head of the nut be of a diameter less than the diameter of the die-side hole and larger than the diameter of the smallest dimension of the aperature—the smallest dimension of the aperature being fractionally (as noted above) larger than the shafts largest portion. Preferably nut-head-diameter is intermediate therebetween, such that the bottom edge of the circumscribing periphery of the nut-head rest on the flared channel wall of the aperature at a location about half-way between the outer-edge of the die-side hole and the above-noted point of smallest dimension, i.e. half-way of the flared-portion of the channel wall. The particular nut's dimensions of its head thus is relative to the size of the die-side hole dimension. Likewise, the particular nut must be undercut, having an enlarged base portion of the nut's shaft, and the diameter of the base or bottom portion of the nut's shaft is fractionally smaller (less) than the diameter of the aperature at its smallest dimension, i.e. a snug insertion fit but small enough for easy and ready insertion, typically one or two thousandths inch less in diameter than the smallest dimension of the aperature. It is to be understood that while such aperature having a flared hole on the die-side is normally obtained as explained above by die-punch conventional method, it is clearly also within the present invention to prepare such an aperature with a corresponding flared-hole on one face (at least one face thereof) by any desired or other method such as with a torch or the like. For purposes of description in this disclosure, the flared-hole shall be referred to as the die-side hole, as previously described.

It therefore should be now appreciated that the method of this invention for use with metal plates of thickness of at least about ¼ inch, requires that the nut shaft be inserted into the die-side hole and that the head thereof be positioned—with its relative dimensions as above-described—to rest about half-way of the flared channel wall. The length of the intermediate nut-shaft portion of smallest diameter adjacent the space of the stepped-portion above the enlarged bottom portion of the nut's shaft, is of a length such that when the top of the nut's head has been preferably pressed downwardly sufficiently for the top of the nut's head to be flush with the face of the die-side metal plate the beginning of the shaft step of the nut at a point (location) at the top of the enlarged bottom portion, the top (of the enlarged bottom portion) being toward the space of the stepped portion, is substantially even with the metal plates punch-side face; optionally, the top of the enlarged bottom portion ( of the nut-shaft) may be slightly within (interior of) the punch-side hole. Accordingly, by the present inventive method, again the method is dependent upon also the length of the intermediate shaft-portion of stepped reduced diameter, and the exact length thereof is dependent upon the specific thichness of metal plate being utilized. For different thickness of metal plates of at least about ¼ inch thickness, correspondingly different nut's shafts are required for the optimal results with the present invention.

Utilizing the proper nut head and nut shaft properly stepped for a designated plate thickness of a metal plate having a die-punched aperature therein, a bottom press having a raised (preferably annular) ring (or ridge) on the press-face, is pressed upwardly against the punch-side metal plate face in juxtaposition to and preferably circumscribing the protruding nut's shaft-bottom portion while the top press is exerting the downward pressure, such that the bottom press ring becomes impressed into the punch-side metal plate's face as to forceably move malleable plate-material (of the metal plate) radially inwardly in direction into intermediate space above and adjacent to and in contact with an upper portion of the shafts' lower end of the nut's shaft; thereby the radially-inwardly-moved metal matter locks-in the nut against withdrawal of the nut, but also a part of the locking-in being the pressing normally concurrently of the lower edge of the nut's head into malleable metal of the flared portion of the channel wall of the punched aperature thereby also forcing more metal plate material into the space of the stepped portion of the nut's shaft, and the nut head becoming fused by press as a top press forceably presses downwardly on the top of the nut's head.

Additionally, however, in addition to utility forces that normally exert extracting-forces on a plate-mounted hut, there are torques that can at least break a fused-seal of a nut, in so far as the nut twisting and turning in its mounted state. Accordingly, as is practiced in the applicant's prior patent U.S. Pat. No. 4,281,786, at a preferably plurality of spaced-apart points spaced around the periphery of the die-side hole of the aperature, there is applied pressure exerted by downwardly-extending tits to press-below the face of the metal plate, thereby causing a greater amount of fusion at these points and to a depth different from adjacent areas surrounding the mounted hut and head thereof, with the result that the head of the nut, and thus the entire hut is locked against revolving within the aperature in which it is otherwise locked. This, in conjunction with the other prior parts described of the inventive process, is a preferred embodiment of the method.

The invention may be better understood by making reference to the Figures in which drawings illustrate matters discussed above.

THE FIGURES

FIG. 1 illustrates diagrammatically an in-part side cross-sectional view of upper and lower presses and mechanism for movement thereof, and intermediate therebetween a metal plate having a nut inserted into a die-punched aperature preparatory to pressing the nut into a mounted state, the metal plate and nut being also in side cross-sectional view.

FIG. 2 illustrates diagrammatically the same subject matter described in and for FIG. 1, except this Figure illustrates the typical appearance in the in-part side cross-sectional view after the upper and lower presses have completed movement toward each other, with the nut being shown in its final mounted state, before withdrawal of the upper and lower presses, this Figure being a view as taken along line 2—2 of FIG. 3.

FIG. 3 again illustrates diagrammatically the subject matter of FIG. 2, as taken along lines 3—3 of FIG. 2, showing the die-side face and cross-section through the upper press's tits (downward projections), as well as the top face of the mounted nut's head.

FIG. 4 diagrammatically illustrates a bottom perspective view of the metal plate with the nut mounted therein, as viewed from the punch-side of the metal plate.

DETAILED DESCRIPTION

First of all, while relationships of sizes and diameters and lengths and the like have been illustrated with an effort to give some appreciation of relative relationships, it should be noted that the Figures are not an engineering blue print and are not necessarily exact in the dimensions and sizes shown, i.e. are not to scale.

As noted above, each and all of FIGS. 1 through 4 relate to a common embodiment, and accordingly the description shall not be repetitious for the different Figures, except where done for purposes of clarity and understanding and following the description.

Figure 1:
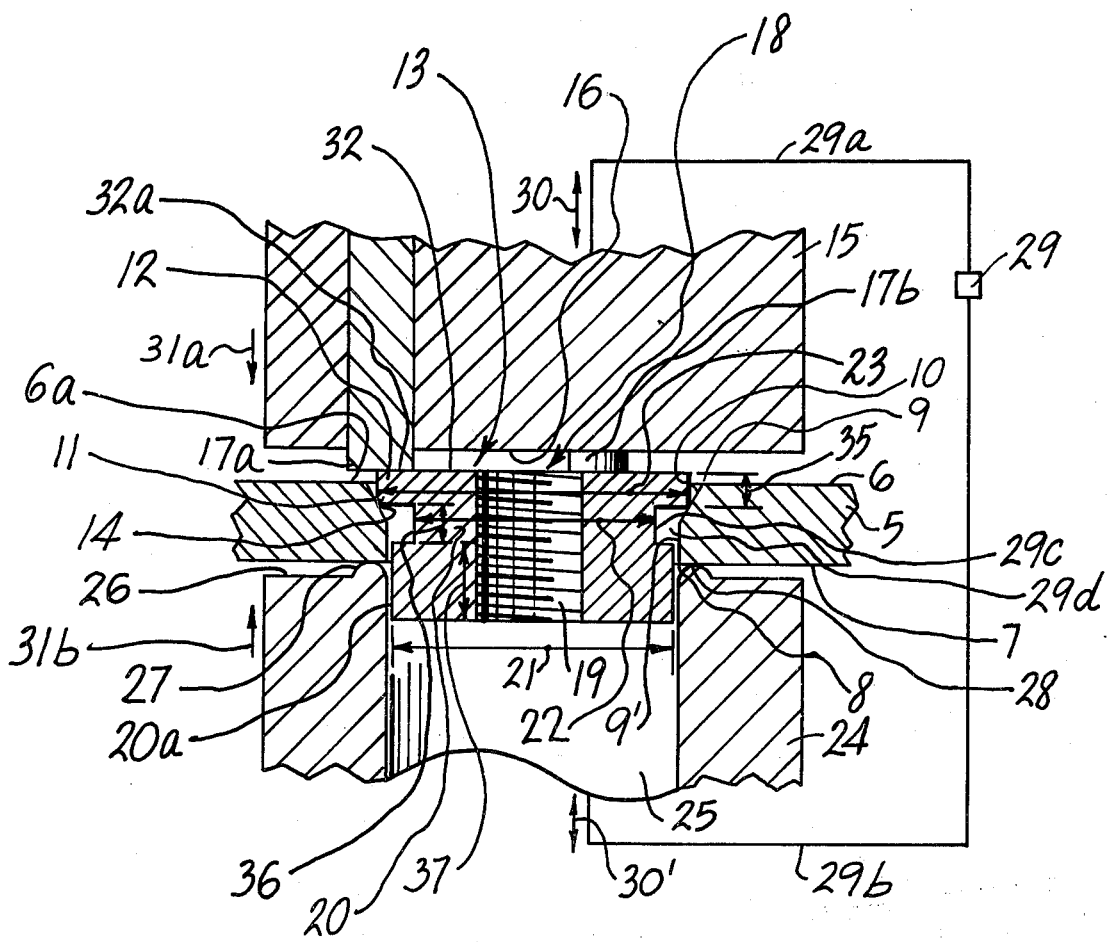

In FIG. 1, there is shown a metal plate (and plate composition thereof) 5 having a die-side face (surface) 6 and a punch-side face (surface) 7. On the punch-side face, there is a punch-side hole 8, and on the die-side face, there is a die-side hole 9. The punch-side hole 8 and die-side hole 9 are interconnected by the aperature formed by flared channel wall 10 and, at the most narrow portions of the aperature, the upright channel wall (vertical channel wall) 9' (adjacent the punch-side hole 9). The nut head's lower circumscribing peripheral edge 11 rests on and against the flared channel wall 10 at location 14 of the flared channel wall, the location 14 being about intermediate half-way down the height-length of the flared channel wall 10. Accordingly, in the preparatory phase of the process, the shaft 20 is inserted into the die-side hole and the nut head's lower edge rested on the flared wall as described, for the nut head 12 of the nut 13.

The upper press 15 has a lower pressing face 16 and downwardly-extending tits or projections 17a (shown in FIG. 1) and 17b and 17c (17b and 17c both shown in FIG. 3) which are also parts of the upper press illustrated as being already resting on top of the edge of the nut 13 on upper nut face 32.

The nut 13 has a central bore (aperature) 18 that has female threads 19, extending through the head 12 and shaft 20. The enlarged bottom or lower portion 20a of the shaft 20 has an outer diameter 21. The side shaft wall along its length is stepped, from the diameter 21 to a lesser diameter 22. The diameter 21 is less than the nut head's diameter 23. Diameter 22 is between intermediate walls 29c of shaft 20.

The lower press 24 is annular or cylindrical in shape, providing room for the shaft's enlarged lower portion 20a, in space 25, and has an upper pressing face 26 and raised portion 27 which is preferably in the shape and form of a raised ridge or raised ring 27 as an upward projection and also part of the pressing structure, being shown already in contact with a lower punch-side face of the metal plate at location 28 adjacent the punch-side hole.

Along the stepped wall of shaft 20 adjacent intermediate wall 29c, there is the space 29d located between the head 12 and the enlarged bottom portion 20a of the shaft 20.

The upper press 15 is moved intermittently upwardly and downwardly in directions 30 by a state-of-the-art conventional mechanism 29a—which does not constitute the inventive subject matter, as controlled by the convention control mechanism 29 also which is not the inventive subject matter, which also controls the conventional mechanism 29 that intermittently moves by mechanism 29b (conventional) the press 24 upwardly and downwardly in directions 30'.

Figure 2:
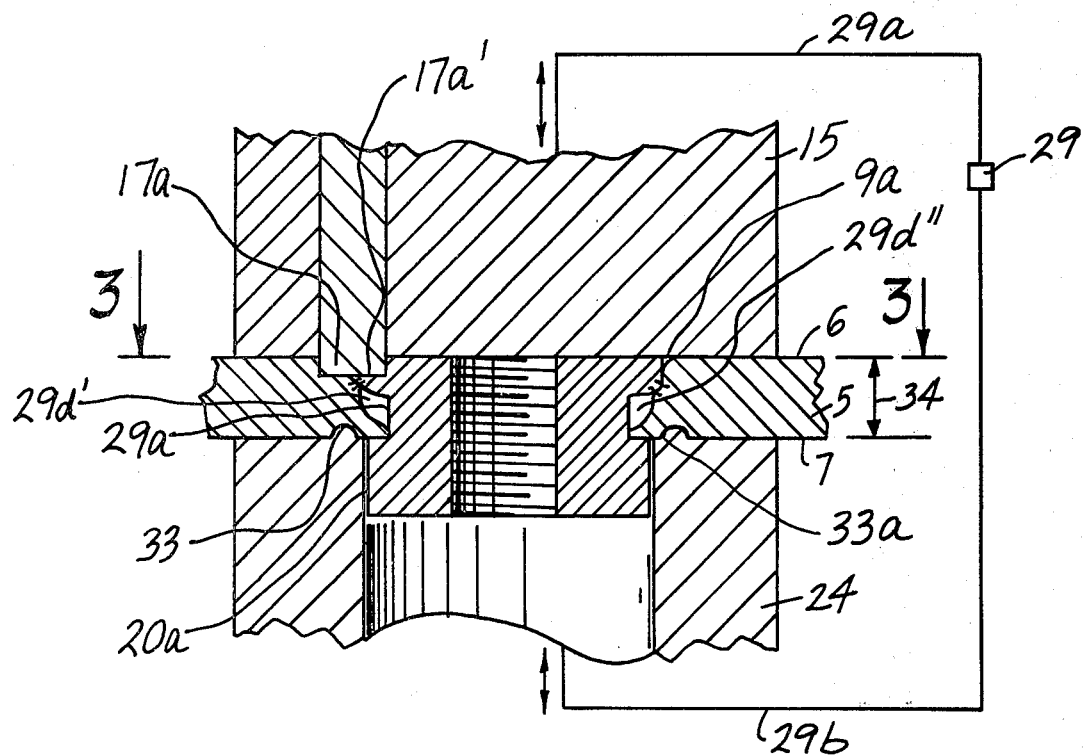

When the nut 13 is to be pressed into its seated and locked position and state as illustrated in FIG. 2, the FIG. 1 illustrated presses 24 and 15 move toward each other (assuming the metal plate 5 is held in a vise or the like) by press 15 moving in the direction 31a and the press 24 moving in direction 31b. As the press 15 moves downwardly, eventually the press face 16 will contact and press downwardly against the nut's upper face 32. As the lower press 24 moves upwardly, eventually the press face 26 will press upwardly against the punch-side face 7 of the metal plate 5, after the ridge 27 first becomes pressed into that face 7 at location(point) 28 adjacent the punch-side hole 8. It is to be appreciated that if the metal plate 5 is not separately supported, the pressing will be effectively achieved by merely the upper press 15 moving downwardly or alternately by merely the lower press 24 moving upwardly, while the other opposing press remains stationary.

FIG. 2 illustrates the typical appearance after completion of the pressing movement of the presses 15 and 24, before withdrawal thereof to release the metal plate and the mounted nut as shown in this figure, in cross-sectional part view. By comparing FIGS. 1 and 2, it can be seen that metal matter(material) at pressed surface 17a'—of both the nut's head (at the overhang) and the adjacent metal plate, has been pressed downwardly and radially inwardly and fused, in-part within the space 29d' (what is left of space 29d) by action of the tit(projection) 17a. Shown on the right side of the FIG. 2 where no tit(projection) is viewable, the wedge and fusion and disfigured nut-head metal and plate metal are differently and less-deeply arranged, but even here there being some evidence that some metal has been added to the location beneath the head's overhang of the nut head 12.

Turning to an observation of the punch-side of plate 5, it is seen that the plate 5 metal at point 33a has been forced into spaces 29d' and 29" by the compression made at points 33, with the metal at 33a being adjacent to and in contact with the upper step and of the lower shaft portion 20a, locking the nut against withdrawal. The depressed or groove area 33 and the raised annularly extending compressed metal 33a may be seen in perspective view in FIG. 4.

Figure 3:
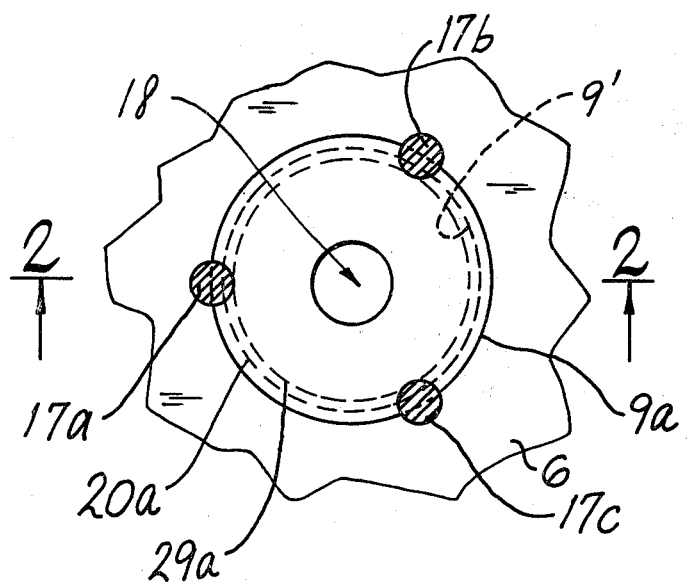

FIG. 3 shows the typical appearance of the seated nut, prior to withdrawal of the tit(projections) 17a, 17b and 17c, which tits are thus shown in cross-section as taken along line 3—3 of FIG. 2. Shown in phantom in this FIG. 3, are the various surfaces (walls) 9', 20a, and 29a previously described. Also, the circular periphery of the top of the seated head 12 is seen as line 9a. The bore 18 and female threads are also indicated as to location.

Figure 4:
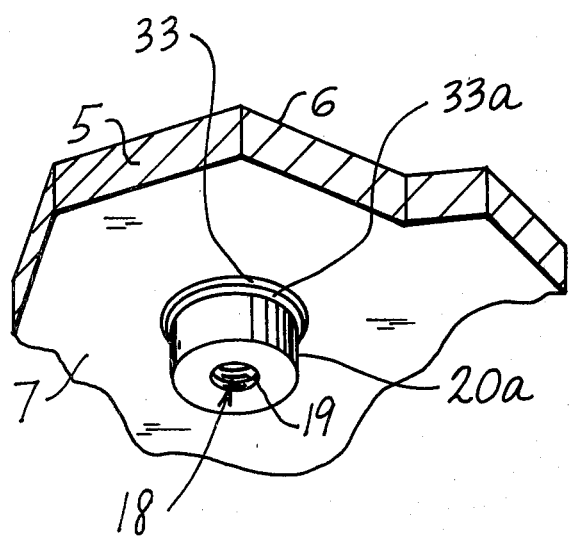

The FIG. 4 illustrates the punch-side of the metal plate having the nut mounted therein. All parts have been previously identified.

It is to be understood, that while this invention has been described with regard to its principal intended use, namely the mounting of metal nuts into metal plates, it is also possible and within the scope of the invention to utilize the invention when using deformable plastic for the nut and/or for the plate.

With regard to the Figures as illustrating the present invention, the illustrations are based on appearances observed in actual reduction to practice of the invention and cut-away section to observe. In that matter, it should be also noted that the resulting bond between the mounted nut and the metal plate is so very great, that even with forces sufficiently great as to bend and/or tear the metal when these forces were exerted on shafts mounted in the female threaded bore, still failed to break-away the nut from its mounting. This is to say, that the inventive process, the nut and the combination are exceptional in success achieved.

It is within the scope of the invention to make such variations and modifications and substitution of the equivalents as would be apparent to a person of ordinary skill in this art.

I claim:

1. A method for mounting a nut within a plate punch-aperture, comprising in combination: die-punching an aperture through a plate having a plate-thickness of at least about ¼ inch to produce punch-side and die-side plate holes between which a punched aperture channel extends, walls forming said punched aperture channel in juxtaposition to said punch side hole being substantially vertical to a plate face surrounding said punch side hole, and walls forming said die-side hole being substantially flared outwardly such that said die-side hole is substantially larger at a die-side plate face relative to said punch-side hole, inserting from a die-side of said aperture a bottom end of a nut having extending axially therethrough a female-threaded through-channel, into and through said aperture, said nut having a first diameter at said bottom end fractionally less than a second diameter of said aperture channel at its most narrow point, and said nut having a head of a third enlarged diameter substantially larger than said second diameter and substantially less than a fourth diameter of said die-side hole, said nut being inserted such that said head at a lower edge thereof rests on a flared surface of said walls forming said punched aperture channel, and said nut having at a location spaced-between said bottom end and said head a shaft diameter less than said first diameter, and thereafter pressing a punch-side face of the plate at a press-location adjacent said punch-side hole with sufficient force to malleably force a ridge of plate-material into intermediate space between said bottom end and said head at a position adjacent said bottom end thereby said nut becomes locked-in against withdrawal from said die-side hole, and thereafter at spaced-apart points circumscribing said die-side hole's periphery pressing adjacent faces of said die-side plate face and a top face of said nut head at locations in juxtaposition to said die-side hole's walls that are substantially flared, such that said nut is locked against turning in the aperture.

2. A method of claim 1, including as said inserting, inserting a nut in which an intermediate shaft thereof between said bottom end and said head at said location is shaped substantially as a step from a nut-shaft end of said bottom end's said first diameter to said shaft diameter less than said first diameter, and said pressing includes applying said force to a plurality of said press-locations substantially circumscribing said punch-side hole sufficiently to force said plate-material into said intermediate space at a plurality of said positions.

3. A method of claim 1, in which said pressing adjacent faces comprises (1) pressing said top face downwardly to a level substantially flush with said die-side plate face, and (2) pressing a small portion of said die-side plate face downwardly below a level of remaining adjacent die-side plate face.

4. A method of claim 3, in which for said pressing adjacent faces, said pressing said top face includes applying downward pressure on substantially the entire top face of said head.

5. A method of claim 1, including pressing adjacent faces of said die-side plate face and a top face of said nut head at locations in juxtaposition to said die-side hole's walls that are substantially flared, such that said nut is locked against turning in the aperture and sufficiently that malleable plate material is compacted against a side face of said head.

6. A method of claim 1, in which for said inserting, the distance is substantially 1/32 inch less than a thickness of said plate.

* * * * *